United States Patent [19]

DeRoos

[11] Patent Number: 4,542,715
[45] Date of Patent: Sep. 24, 1985

[54] INSULATING ASSEMBLY FOR ANIMAL WATERERS

[76] Inventor: Donald J. DeRoos, 504 34th Ave., Council Bluffs, Iowa 51501

[21] Appl. No.: 572,872

[22] Filed: Jan. 23, 1984

[51] Int. Cl.$^4$ .............................................. A01K 7/00
[52] U.S. Cl. ........................................ 119/72; 119/73
[58] Field of Search .............................. 119/72, 73, 61

[56] References Cited

U.S. PATENT DOCUMENTS

| | | | |
|---|---|---|---|
| 968,613 | 8/1910 | Van Ostrand | 119/72 |
| 3,086,737 | 4/1963 | Hyman | 244/153 R |
| 3,745,977 | 7/1973 | Martin | 119/73 |
| 3,943,889 | 3/1976 | Sparber | 119/73 |
| 4,003,340 | 1/1977 | Kuzara et al. | 119/73 |
| 4,081,158 | 3/1978 | Pearce | 244/153 R |
| 4,286,546 | 9/1981 | Moore | 119/61 |

FOREIGN PATENT DOCUMENTS 2098447 11/1982 United Kingdom ................. 119/72

Primary Examiner—Hugh R. Chamblee

[57] ABSTRACT

An insulating assembly is provided for animal waterers. The insulating assembly includes a large sheet of flexible, closed-cell foam material preferably at least as large as the largest top opening of an animal waterer with which the insulating assembly is to be used. The insulating sheet is cut to the shape of the opening of the waterer, but preferably slightly smaller so as to leave a gap between the edges of the sheet and the side walls of the waterer. An opening is cut in an intermediate portion of the insulating sheet through which water can enter from below the sheet for access to the animals when they push the insulating sheet down into the water with their noses. A plurality of weights are provided which are connected by lines to the sheet, preferably extending up through the sheet and washers thereabove and then being tied in knots. The lines are long enough so that the weights can rest on the bottom of the waterer when it contains water at the maximum level.

6 Claims, 6 Drawing Figures

INSULATING ASSEMBLY FOR ANIMAL WATERERS

This invention relates to an insulating assembly to be used with an animal waterer to inhibit heat loss.

Insulating covers for animal waterers have heretofore been known, as shown in U.S. Pat. Nos. 3,745,977; 4,003,340; 4,286,546; and 4,320,720. These covers have all been of a rigid nature and tailor fit for a particular watering trough or dish. They also have been of relatively expensive design or construction.

The present provides an insulating assembly for an animal waterer and particularly for beef and dairy cattle. The assembly comprises an insulating sheet of flexible, closed-cell foam material which is of the same shape as the top opening of the waterer but preferably slightly smaller so as to leave a small gap between the edges of the insulating sheet and the side walls of the waterer. The sheet is of a lighter density than the water so as to float on the surface thereof. An intermediate opening is provided in the sheet upwardly through which water can flow when an animal pushes the sheet downwardly into the water with its nose. A plurality of lines extend downward from the sheet to weights which preferably rest on the bottom of the waterer to prevent the sheet from being blown away or possibly pushed or pulled out of the water by an animal. The lines extend through openings cut in the sheet and also extend through washers on top of the sheet where the lines are knotted. The lines can also extend through central openings in the weights and are knotted below the weights. The weights have recesses in which the knots are received so that the weights can lay flat on the bottom of the waterer.

The insulating assembly can be provided in kit form, in which instance the insulating sheet is provided in a size at least as large as the top opening of the largest waterer with which the kit will be used. The sheet can then be easly cut with scissors to the desired shape and size. The intermediate opening is also cut in the desired location in the sheet or several can be cut in desired locations through which the water can flow upwardly. One long line or several lines can be provided in the kit along with weights and a washer for each of the weights. The line for each weight is of sufficient length so as to be slightly slack when the weights rest on the bottom of the waterer, the sheet is floating on the surface of the water, and the water is at the highest level in the waterer. Openings can be slit at desired locations in the sheet through which the lines are passed. The lines can be knotted to the weights and then extended upwardly through the openings in the sheet where they are passed through the washers and knotted above the sheet.

It is, therefore, a principal object of the invention to provide an insulating assembly for use with a waterer, which assembly is relatively simple, maintenance free, and low in cost.

Another object of the invention is to provide an insulating assembly kit which can be used with a number of different waterers which vary in size and shape.

Many other objects of the invention will be apparent from the following detailed description of a preferred embodiment, thereof reference being made to the accompanying drawings, in which.

Figure 1:
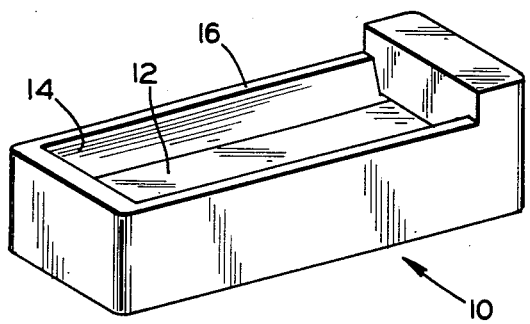
FIG. 1 is a schematic view in perspective of one type of waterer with which the insulating assembly can be used.

FIG. 1 shows a large animal waterer indicated at 10 which includes a bottom 12 and side walls 14 forming a top opening 16.

Figure 2:
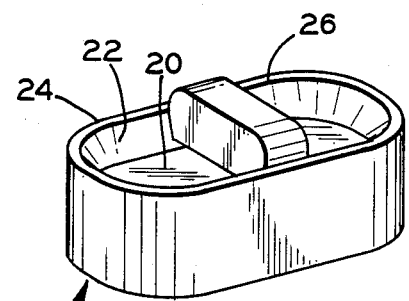
FIG. 2 is a schematic view in perspective of another waterer with which the insulating assembly can be used.

FIG. 2 shows a smaller animal waterer 18 having a bottom 20 and sidewalls 22 forming top openings 24 and 26. The waterers come in a wide variety of sizes and shapes.

Figure 3:
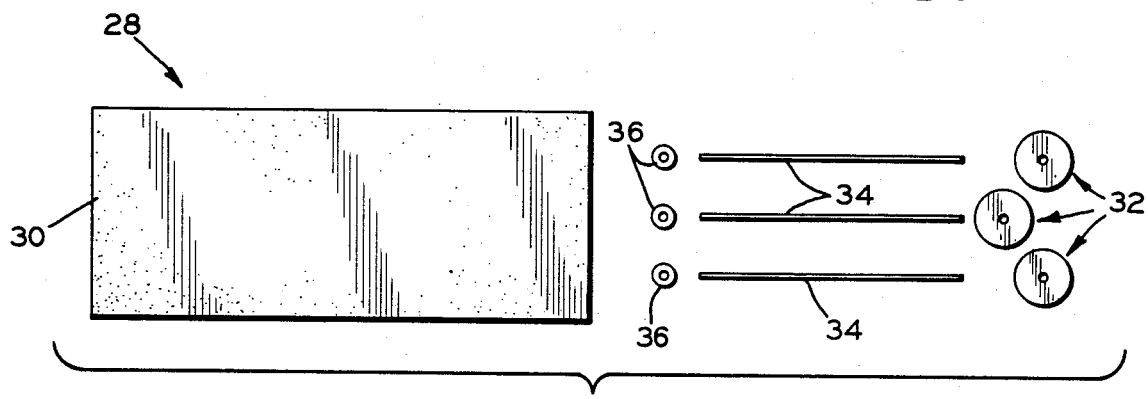
FIG. 3 is a top view of an insulating assembly kit showing the components provided therefore.
Figure 6:
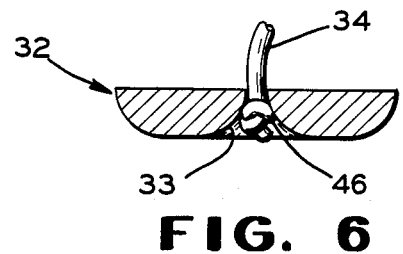
FIG. 6 is a view in transverse cross section taken through a weight and line of the insulating assembly.
Figure 5:
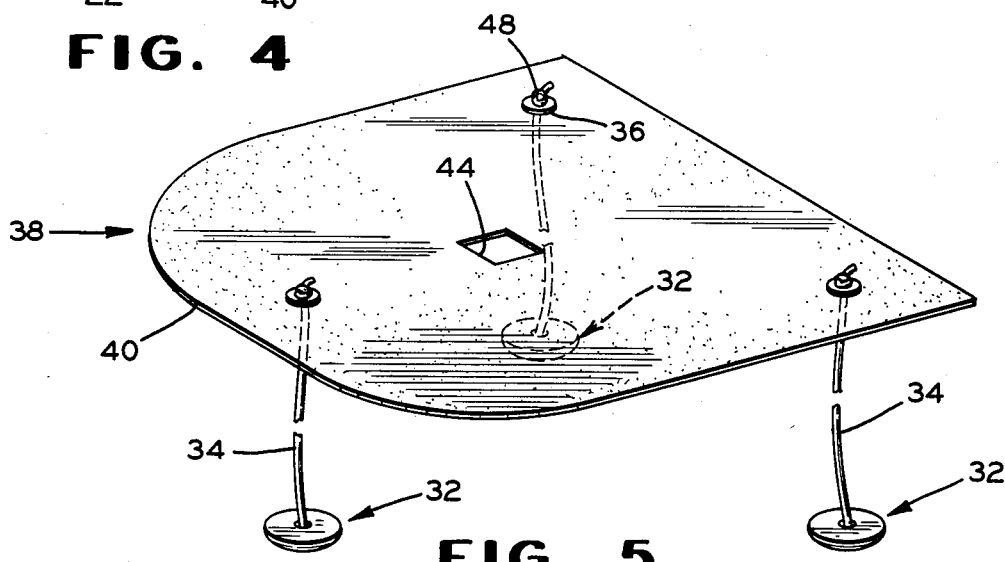
FIG. 5 is a view in perspective of the insulating assembly.

FIG. 3 shows an insulating assembly kit indicated at 28 which can be commercially available in a suitable package. The kit 28 includes an insulating sheet 30 of flexible, closed-cell foam material which is preferably polyurethane. It preferably is rectangular in shape and of a size to be at least as large as the top opening of the largest waterer with which the kit is to be used. If desired, the kits can be supplied in two sizes, one having a large insulating sheet and another having one or two small insulating sheets. The kit 28 further includes a plurality of weights 32 which can be of cast iron. As shown in FIGS. 5 and 6, in particular, the weights are of annular shape in the form of a hemi-torus with central recesses 33 to receive knots of the lines so that the weights can lie flat on the bottom of the waterer. The kit 28 further includes lines 34, preferably of nylon, each of which is sufficiently long to connect the weight laying on the bottom of the waterer and the sheet 30 floating on the top of the water when the water is at its highest level. Rather than the individual lines 34, a single longer line can be provided which can be cut to the desired lengths. Finally, the kit 28 includes washers or washer-like members 36, there being one washer for each of the weights 32.

Figure 4:
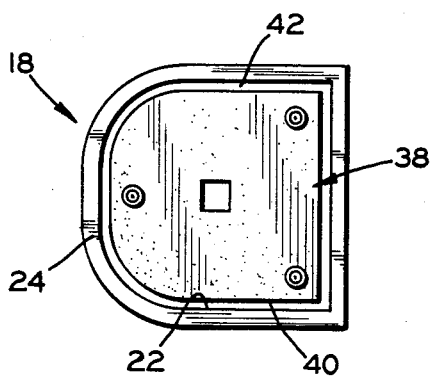
FIG. 4 is a top view of an insulating assembly in place in a waterer.

An insulating assembly according to the invention is indicated at 38 in FIGS. 4 and 5. A finished insulating sheet 40 is made from the sheet 30 of the kit 28 by trimming the sheet to proper size and shape, conforming to the shape of the top opening 22 of the waterer 18 shown in FIG. 4, for example, but being slightly smaller to leave a gap 42 between the edges of the sheet 40 and the side walls 22 of the waterer 18. An opening 44 is cut in an intermediate portion of the sheet 40 so that when the sheet floats on the surface of the water in the waterer, the water can flow upwardly through the opening 44 when an animal pushes down on the sheet 40 with its nose. The animal can then drink freely; the sheet will rise to the surface of the water again when the animal raises its head. With a larger waterer such as the waterer 10 in FIG. 1, several of the openings 44 can be cut in the sheet. Two or more kits can also be used for very large waterers.

Slits or openings are also cut in the sheet 40 at desired locations where the weights are to be located. Usually three weights are sufficient for a sheet of the size of the sheet 40 whereas 4 to 6 weights might be employed for a large single sheet used with the waterer 10, FIG. 1. One end of each of the lines 34 is knotted to form an enlargement or knot 46 and the line extended upwardly through the weight 32. The knot thus attaches the line to the weight and is located in the central recess 33 of the weight whereby the weight can rest in a flat position on the bottom 20 of the waterer. The upper end of the line 34 is extended through the appropriate slit or opening in the sheet 40 and is extended through the washer 36 where a second enlargement or knot 48 is tied in the line to attach the line to the sheet 40. The lines 34 preferably are slightly slack when the weights 32 rest on the bottom and the sheet 40 floats on the surface of the water when at its highest level. The sheet thereby can float on the water at all levels of the water and yet the weights prevent the sheet from being blown off the surface of the water or possibly being pushed or pulled off by the animals.

From the above, it would be seen that the insulating assembly 38 according to the invention is relatively low in coast and maintenance free. It can be readily removed from the waterer when ambient temperatures rise sufficiently and can be easily stored by being rolled up. Further, the insulating kit 28 enables the assembly to be tailored to any waterer size or shape with the sheet 30 easily being cut to shape and the lines 34 being readily cut to the desired lengths and easily attached to the weights 32 and the finished sheet 40.

The sheet 30 can be in the order of 3/16th inch thick and preferably from $\frac{1}{8}$ to $\frac{3}{8}$ inch thick and is of a light density to float on water and to increase the insulating effectiveness of it. However, the sheet should not be so light in weight that the washers 36 will tear out of it or the sheet itself will tear through normal use by the animals.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In combination, a waterer for animals comprising a container holding water with a bottom, side walls and an open top, an insulating sheet of flexible, closed-cell foam material having a shape similar to the shape of the top of the container but smaller to leave a gap between edges of the sheet and the side walls of the container, said sheet being on the surface of the water, said sheet having an intermediate opening therein spaced from the edges thereof and communicating with the water, a plurality of weights located in the water below said sheet, and lines connected to said weights and to said sheet to prevent said sheet from being blown out of the water, said lines being connected to said sheet by extending through openings in said sheet and through openings in members above said sheets, with the upper ends of said lines having enlargements above said members, said weights having central openings through which said lines extend, with said lines having lower enlargements below said weights.

2. The combination according to claim 1 characterized by said weights having recesses below said openings and said lower enlargements being located in said recesses.

3. An insulating assembly to be used with a waterer for animals to reduce loss of heat from water therein, said assembly comprising an insulating sheet of flexible closed-cell foam material of predetermined size and shape, said sheet having an intermediate opening therein through which water can flow upwardly when a portion of the sheet is pushed downwardly into the water by an animal, at least one weight, and line means connecting said weight to an intermediate portion of said sheet to prevent said sheet from being blown away, said line means extending through an opening in said sheet, a washer-like member having an opening through which said line means extends above said sheet, said line means being tied in an upper knot above said member to connect said line means to said sheet, said weight having a central opening through which said line means extends, said line means being attached to said weight by being tied in a lower knot below said weight.

4. An insulating assembly according to claim 3 characterized by said weight having a recess below said weight opening, said lower knot being located in said recess, whereby said weight can lie flat on the bottom of the waterer.

5. An insulating assembly kit to be used to provide insulation for a waterer for animals to reduce loss of heat from water therein, said assembly kit comprising an insulating sheet of flexible, closed-cell foam material at least as large as the largest top opening of the waterer with which the assembly may be used, a plurality of weights, each having means for being attached to a line, a plurality of washer-like members, one for each of said weights, to aid in connecting lines to said sheet, and at least one line of sufficient length to connect said weights to said sheet when the weights are in the water at a substantial distance below said sheet, each of said weights having a central opening through which the line extends.

6. An assembly kit according to claim 5 characterized by each of said weights having a recess to receive a knot in the line whereby the weights can lay flat on the bottom of the waterer.

* * * * *